United States Patent
Anisimov et al.

(10) Patent No.: US 9,924,038 B2
(45) Date of Patent: *Mar. 20, 2018

(54) METHOD AND SYSTEM FOR INTEGRATING AN INTERACTION MANAGEMENT SYSTEM WITH A BUSINESS RULES MANAGEMENT SYSTEM

(71) Applicant: GENESYS TELECOMMUNICATIONS LABORATORIES, INC., Daly City, CA (US)

(72) Inventors: Nikolay Anisimov, Concord, CA (US); Yevgeniy Petrovykh, Walnut Creek, CA (US); Mark Scott, Kirkland, WA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,661

(22) Filed: Jan. 3, 2017

(65) Prior Publication Data

US 2017/0118343 A1 Apr. 27, 2017

Related U.S. Application Data

(63) Continuation of application No. 14/796,899, filed on Jul. 10, 2015, now Pat. No. 9,538,010, which is a
(Continued)

(51) Int. Cl.
*H04M 3/51* (2006.01)
*H04M 3/523* (2006.01)
(Continued)

(52) U.S. Cl.
CPC ........ *H04M 3/5191* (2013.01); *G06Q 10/067* (2013.01); *H04M 3/51* (2013.01);
(Continued)

(58) Field of Classification Search
None
See application file for complete search history.

(56) References Cited

U.S. PATENT DOCUMENTS 4,852,180 A 7/1989 Levinson
5,625,748 A 4/1997 McDonough et al.
(Continued)

FOREIGN PATENT DOCUMENTS

CN 102257800 A 11/2011
EP 1484903 A2 12/2004
(Continued)

OTHER PUBLICATIONS

Chinese Office Action dated May 13, 2013 for Chinese Application 200980151195,7 with English Translation, 15 pages.
(Continued)

*Primary Examiner* — Harry S Hong
(74) *Attorney, Agent, or Firm* — Lewis Roca Rothgerber Christie LLP (57) ABSTRACT

In a contact center, a system for processing communication events has an interaction server for managing events waiting to be routed, a routing server for routing the events, a rules engine, and a gateway server executing rules invocation logic and interacting with the rules engine. The interaction server tracks incoming events, initiates and sends a routing request to the routing server, including a special routing object, for each event that requires conformance to business rules, the routing server, executing the routing object, sends an execution request to the gateway server, which upon receipt of the request prepares a business object model (BOM), being a set of facts upon which the rules engine executes rules appropriate to the facts, resulting in routing direction for the routing server to route the event.

18 Claims, 5 Drawing Sheets

Related U.S. Application Data continuation of application No. 14/149,789, filed on Jan. 7, 2014, now Pat. No. 9,083,802, which is a continuation of application No. 12/339,988, filed on Dec. 19, 2008, now Pat. No. 8,654,963.

(51) Int. Cl.
  *H04M 7/00* (2006.01)
  *G06Q 10/06* (2012.01)

(52) U.S. Cl.
  CPC ....... *H04M 3/5175* (2013.01); *H04M 3/5183* (2013.01); *H04M 3/5232* (2013.01); *H04M 2201/16* (2013.01)

(56) References Cited

U.S. PATENT DOCUMENTS

| | | | |
|---|---|---|---|
| 6,212,178 B1 | 4/2001 | Beck et al. | |
| 6,308,154 B1 | 10/2001 | Williams et al. | |
| 6,363,346 B1 | 3/2002 | Walters | |
| 6,404,857 B1 | 6/2002 | Blair et al. | |
| 6,542,602 B1 | 4/2003 | Elazar | |
| 6,594,629 B1 | 7/2003 | Basu et al. | |
| 6,678,658 B1 | 1/2004 | Hogden et al. | |
| 6,687,671 B2 | 2/2004 | Gudorf et al. | |
| 6,721,416 B1 | 4/2004 | Farrell | |
| 6,724,887 B1 | 4/2004 | Eilbacher et al. | |
| 6,895,083 B1 | 5/2005 | Bers et al. | |
| 6,910,072 B2 | 6/2005 | Macleod Beck et al. | |
| 6,959,080 B2 | 10/2005 | Dezonno et al. | |
| 7,065,493 B1 | 6/2006 | Homsi | |
| 7,092,888 B1 | 8/2006 | McCarthy et al. | |
| 7,340,410 B1 | 3/2008 | Vaillancourt et al. | |
| 7,487,094 B1 | 2/2009 | Konig et al. | |
| 8,275,110 B2 | 9/2012 | Vendrow | |
| 8,463,606 B2 | 6/2013 | Scott et al. | |
| 8,600,756 B2 | 12/2013 | Pickering et al. | |
| 8,612,272 B1 | 12/2013 | Aykin | |
| 8,654,963 B2 | 2/2014 | Anisimov et al. | |
| 8,767,947 B1 | 7/2014 | Ristock et al. | |
| 9,083,802 B2 | 7/2015 | Anisimov et al. | |
| 9,262,213 B1 | 2/2016 | Gralhoz et al. | |
| 9,538,010 B2* | 1/2017 | Anisimov | H04M 3/51 |
| 2002/0029161 A1 | 3/2002 | Brodersen et al. | |
| 2002/0112055 A1 | 8/2002 | Capers et al. | |
| 2003/0088403 A1 | 5/2003 | Chan et al. | |
| 2003/0145071 A1 | 7/2003 | Straut et al. | |
| 2004/0024598 A1 | 2/2004 | Srivastava et al. | |
| 2004/0062364 A1 | 4/2004 | Dezonno et al. | |
| 2004/0083195 A1 | 4/2004 | McCord et al. | |
| 2005/0240594 A1 | 10/2005 | McCormack et al. | |
| 2007/0038499 A1 | 2/2007 | Margulies et al. | |
| 2007/0198322 A1 | 8/2007 | Bourne et al. | |
| 2007/0198330 A1 | 8/2007 | Korenblit et al. | |
| 2008/0120164 A1 | 5/2008 | Hassler | |
| 2009/0018890 A1 | 1/2009 | Werth et al. | |
| 2009/0043634 A1 | 2/2009 | Tisdale | |
| 2009/0048868 A1 | 2/2009 | Portnoy et al. | |
| 2009/0204470 A1 | 8/2009 | Weyl et al. | |
| 2009/0225971 A1 | 9/2009 | Miller et al. | |
| 2009/0326947 A1 | 12/2009 | Arnold et al. | |
| 2010/0107165 A1 | 4/2010 | Koskimies et al. | |
| 2010/0172485 A1 | 7/2010 | Bourke et al. | |
| 2010/0246784 A1 | 9/2010 | Frazier et al. | |
| 2010/0296417 A1 | 11/2010 | Steiner | |
| 2011/0010173 A1 | 1/2011 | Scott et al. | |
| 2011/0047002 A1 | 2/2011 | Flockhart et al. | |
| 2011/0125498 A1 | 5/2011 | Pickering et al. | |
| 2011/0153378 A1 | 6/2011 | Costello et al. | |
| 2011/0178803 A1 | 7/2011 | Petrushin | |
| 2011/0191106 A1 | 8/2011 | Khor et al. | |
| 2011/0255682 A1 | 10/2011 | Flockhart et al. | |
| 2011/0255683 A1 | 10/2011 | Flockhart et al. | |
| 2012/0227044 A1 | 9/2012 | Arumugham et al. | |
| 2013/0083916 A1 | 4/2013 | Flockhart et al. | |
| 2013/0132583 A1 | 5/2013 | McCord | |
| 2013/0179208 A1 | 7/2013 | Chung et al. | |
| 2013/0246053 A1 | 9/2013 | Scott et al. | |
| 2013/0254139 A1 | 9/2013 | Lei | |
| 2014/0079210 A1 | 3/2014 | Kohler et al. | |
| 2014/0119535 A1 | 5/2014 | Anisimov et al. | |
| 2014/0146961 A1 | 5/2014 | Ristock et al. | |
| 2014/0278640 A1 | 9/2014 | Galloway et al. | |
| 2014/0337072 A1 | 11/2014 | Tamblyn et al. | |
| 2015/0089466 A1 | 3/2015 | Rodgers et al. | |
| 2015/0312415 A1 | 10/2015 | Anisimov et al. | |

FOREIGN PATENT DOCUMENTS

| | | |
|---|---|---|
| EP | 1402520 B1 | 10/2006 |
| JP | 2005012781 A | 1/2005 |
| JP | 2005504452 A | 2/2005 |
| JP | 2012513165 A | 6/2012 |
| JP | 5616357 B2 | 10/2014 |
| KR | 1020110097853 A | 8/2011 |
| WO | 2002065741 A2 | 8/2002 |
| WO | 2010080323 A2 | 7/2010 |
| WO | 2010080323 A3 | 10/2010 |
| WO | 2014085760 A1 | 6/2014 |

OTHER PUBLICATIONS

Chinese Office Action for CN Application No. 200980151195.7, with Machine English Translation, dated Dec. 25, 2013, 12 pages.

European Patent Office Action for Application No. 09801338.6, dated Aug. 17, 2016, 4 pages.

Examination Office Letter dated Jan. 24, 2013 for Japanese Application 2011-542265, 4 pages.

International Search Report dated Sep. 12, 2014 for PCT/US2014/037587, 13 pages.

International Search Report for PCT/US2013/072484, dated Feb. 28, 2014, 3 pages.

Japanese Office Action, issued in JP Application No. 2011-542265, with Machine English Translation, dated Jan. 23, 2014, 4 pages.

Johnson, Sue, Describe what is meant by the term "keyword spotting" and describe the techniques used to implement such a recognition system, Mphil Computer Speech and Language Processing Speech Recognition Essay, Apr. 24, 1997, 26 pages.

Korean Preliminary Rejection dated Jul. 17, 2012 for Korean Application No. 10-2011-7014074, with English Translation, 10 pages.

Koutras A., et al., "Blind Speech Separation of Moving Speakers in Real Reverberant Environments," WCL, Electrical & Computer Engineering Department, University of Patras, 26100 Patras, Hellas, 4 pages.

Written Opinion of the International Searching Authority for International Application PCT/US09/67441 dated Jun. 28, 2010, 5 pages.

Intellectual Property India Examination Report for Application No. 4149/CHENP/2011, dated Apr. 25, 2017, 7 pages.

\* cited by examiner

Fig. 5 ions that are closely tied to business policy, could
rely on logic that is expressed in the form of business rules.

Therefore, what is clearly needed is a contact center
architecture that provides enhanced integration of business
rule management and interaction workflow management.

METHOD AND SYSTEM FOR INTEGRATING AN INTERACTION MANAGEMENT SYSTEM WITH A BUSINESS RULES MANAGEMENT SYSTEM

CROSS-REFERENCE TO RELATED APPLICATIONS

This application is a continuation of U.S. patent application Ser. No. 14/796,899, filed on Jul. 10, 2015, now U.S. Pat. No. 9,538,010, which is a continuation of U.S. patent application Ser. No. 14/149,789, filed on Jan. 7, 2014, now U.S. Pat. No. 9,083,802, which is a continuation of U.S. of Ser. No. 12/339,988, filed on Dec. 19, 2008, now U.S. Pat. No. 8,654,963, the content of all of which are incorporated herein by reference.

BACKGROUND OF THE INVENTION

1. Field of the Invention

The present invention is in the field of computer integrated telephony including data network telephony and other network-supported electronic communication, and pertains particularly to a system for integrating interaction management and business rules management tasks within a contact center environment.

2. Discussion of the State of the Art

In the field of telecommunications and electronic messaging, development of interaction management and rules-based treatments for customers calling into a contact center or engaging in electronic interaction, such as email with a contact center, continues. A state-of-art contact center as known to the inventors may handle telephone interactions including data network telephony (DNT), and all forms of electronic messaging including email, instant messaging (IM), chat, short message service (SMS), and multimedia message service (MMS), as well as voice calls. Other interaction types such as Web servicing of interactive forms and applications including voice-based Web interactions are common and a state-of-art contact center is generally equipped to handle every type of communication.

It is important for a contact center to meet certain service objectives that are relevant to sales, efficiency, service rating, and so on. Therefore, a contact center management process is constantly seeking new and better ways to streamline processes and resource requirements like software, equipment and such to make the center more efficient, using less overhead. Interaction routing systems and equipment, workflow management systems and equipment, customer relations management systems and equipment, and rules management systems and equipment are typically a part of a contact center apparatus.

Many different types of interactions routinely occur between agents/automated systems and customers in a contact center. It is desirable to be able to optimize contact center workflow including interaction, routing, resource allocation, and other like tasks so that these processes are performed in a most efficient and cost productive manner. Therefore, contact centers typically rely on a set of rules or policies that govern the daily activities of the center, including how interaction is handled. One problem with traditional contact center management is that interaction management and business management are not well integrated in terms of overall workflow.

Current contact center applications contain sophisticated logic that is mainly implemented in the form of IVR scripts, routing strategies, agent scripts, and so on. It has occurred to the inventor that some contact center applications, especially applications that are closely tied to business policy, could rely on logic that is expressed in the form of business rules.

Therefore, what is clearly needed is a contact center architecture that provides enhanced integration of business rule management and interaction workflow management.

SUMMARY OF THE INVENTION

A problem stated above is that it is desired in a contact center to integrate interaction workflow management and business process management for streamlining how interactions are handled within the center. However in current state-of-art contact centers interaction workflow and business process are largely separated entities that may communicate with one another but that are not well integrated.

The inventors therefore considered functional elements of a contact center system, looking for elements that could be defined in an abstract way and that could be functionally integrated to provide business process and interaction workflow orchestration, but in a manner that would not create time delay or added interaction load on the system.

Every contact center is driven by interaction workflow and business policy enactment at some level, one by-product of which is additional load due to parallel processes that are relevant to a same interaction but are not well integrated with each other. Most such contact centers employ business process management services and interaction routing services and business rule engines and routing systems are typically a part of such apparatus.

The present inventors realized in an inventive moment that if, at the point of interaction event handling could be tied directly to business policy, significant streamlining might result with respect to interaction workflow. The inventor therefore constructed a unique business process routing system for handling interactions represented as open media sessions that allowed most interaction types to be handled according to business rule execution results while tasking into account dynamic characteristics of interaction objects and contact center statistics. A significant improvement in efficiency results including capability of automatically updating certain contact center objects when needed.

Accordingly, in a contact center, according to one embodiment of the present invention, a system for processing communication events is provided, comprising an interaction server for managing events waiting to be routed, a routing server for routing the events, a rules engine, and a gateway server executing rules invocation logic and interacting with the rules engine. The interaction server tracks incoming events, initiates and sends a routing request to the routing server, including a special routing object, for each event that requires conformance to business rules, the routing server, executing the routing object, sends an execution request to the gateway server, which upon receipt of the request prepares a business object model (BOM), being a set of facts upon which the rules engine executes rules appropriate to the facts, resulting in routing direction for the routing server to route the event.

In another aspect of the invention a method for routing an interaction event in a contact center is provided, comprising the steps of (a) representing the interaction event in an interaction server using an abstract markup language; (b) requesting a routing strategy for handling the event; (c) sending a routing object to a routing server, which when it executes the routing object sends a request to a gateway server; (d) at the gateway server, in response to the request, creating a business object model representing a set of facts relevant to the interaction event and contact center state information; (e) starting a business rule engine to execute one or more business rules using the business object model as data for rule execution; and (f) returning the results of rule execution to the routing strategy.

DETAILED DESCRIPTION

The inventors provide a system and methods for routing interactions in a contact center according to business process rules. The system includes a vehicle for automatically updating certain contact center states. The present invention is described in enabling detail relative to the following embodiments.

Figure 1:
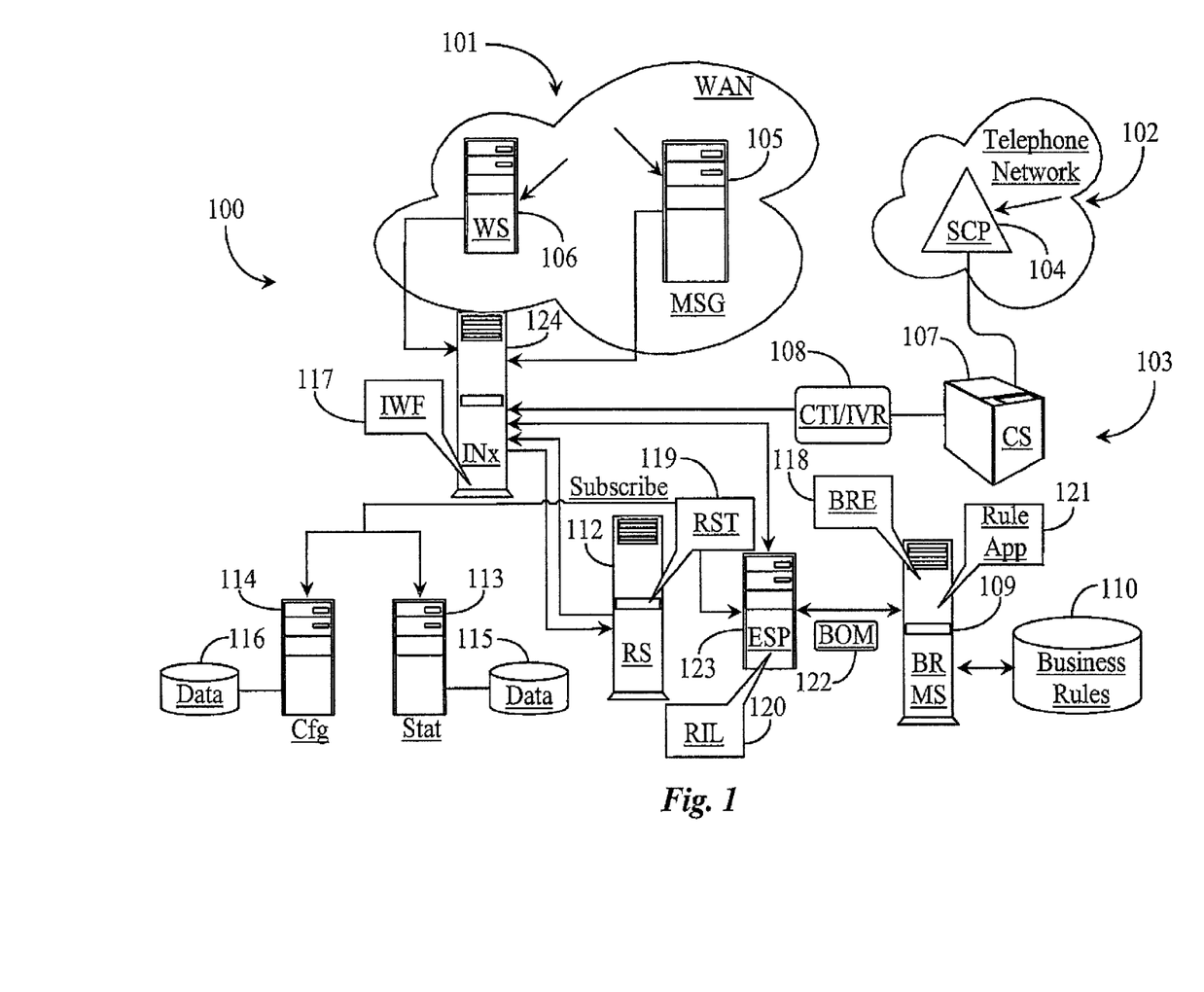
FIG. 1 is an architectural overview of a contact center environment where business process routing is practiced according to an embodiment of the present invention.

FIG. 1 is an architectural overview of a contact center environment 100 where business process routing is practiced according to an embodiment of the present invention. Contact center environment 100 is further illustrated in this example by contact center equipment 103 connected by a network, such as a local area network (LAN). Contact center equipment group 103 may be referred to simply as contact center (CC) 103 in this specification. A state of art contact center such as CC 103 has connectivity to at least one network through which potential customers of the center may have access to contact center services.

Environment 100 includes a wide area network (WAN) 101 and a telephone network 102. WAN 101 may be a corporate WAN, a private WAN, or a municipal area network (MAN). WAN 101 may be the Internet network in a preferred embodiment because of its high public access characteristic. WAN 101 may be referred to herein as Internet 101. Internet 101 represented logically by a network cloud includes all of the lines, equipment, and access points that make up the Internet as a whole. Therefore there are no geographic limits to the practice of the present invention. Telephone network 102 may be a private telephone network or a public network such as the well known public switched telephone network (PSTN). Telephone network 102 may be referred to herein as PSTN 102, and represents all of the lines, equipment, and access points that make up a PSTN as a whole, including other connected carrier networks and Internet 101. Network lines such as access lines and network backbones are logically represented herein as connection lines between nodes on the network.

CC 103 may maintain an Internet Web server (WS) 106 within the domain of Internet 101 for maintenance and serving of a company website through which Web services may be provided. Web server 106 includes a digital medium provided thereto by installation or through network or data link connection for storing electronic information pages for service. Web services may include sales, technical support, billing, and information services, as well as other services. Customers of CC 103 that access CC services through Internet 101 and WS 106 are represented herein by a directional arrow representing user connectivity to WS 106 from anywhere on the network.

Access to WS 106 may be accomplished through an Internet-capable appliance such as a Laptop or desktop computing system or any other appliance including an Internet-capable cellular telephone, a personal digital assistant (PDA) or other device having a network browser for navigating to a Web site and an interactive interface for interaction. A message server (MSG) 105 is illustrated within Internet 101 and represents a server such as a mail server through which email may be delivered to contact center 103. Message server 105 includes a digital medium provided thereto by installation or network or data link connection for storing email messages for delivery and download. Web server 106 comprises at least one Web site that is serviced through CC 103.

Such a Web site may include a log-in page, a customer registration page, a product and services description page, a download page and a customer contact page for enabling Web customers to communicate with center 103. Web customers that connect to WS 106 may initiate Web sessions such as chat, Web call back, purchase and checkout, instant messaging, post and reply, and email. WS 106 is connected to an interaction server (Inx) 124 within CC 103.

Interaction server 124 is a server node maintained by CC 103 that represents all incoming CC interactions between customers and CC 103 in an abstract way such as by representing the interactions as open media sessions using open media language. Interaction server 124 includes a digital medium provided thereto by installation or network or data link connection, for storing CC applications used to represent interaction workflow. An interaction work flow (IWF) application 117 represents the monitored flow of any interaction represented in server 124. Server 124 may represent both Web initiated interactions and telephony interactions including Voice Extensible Markup Language (VXML)-based interactions with customers of the call center.

Interaction server 124 has connection to a computer telephone integrated (CTI) processer/server 108 that is connected by a CTI link to central telephone switch (CS) 107 maintained at the call center. Telephone interactions are represented in real time at server 124 as open media sessions. Switch 107 may be a private branch exchange (PBX), an automated call distributor (ACD) or a soft telephone switch implemented in software (SW). Call center 103 has connection to PSTN 102 through CS 107 and a telephone trunk line.

A service control point (SCP) 104 is illustrated within telephone network 102 and represents any switching facility through which telephone calls may be received and routed to CS 107 for treatment. SCP 104 provides an access point into contact center 103. Potential callers using SCP as a first service point for CC 103, such as toll-free calls, are represented by a directional arrow signifying incoming call events. Interactive voice response (IVR) treatment may be provided to CS 107 for interfacing with callers registered at the switch to determine, among other things, a purpose for the call.

CTI processor/server 108 provides intelligent routing capabilities to switch 107. A voice application server (VAS)

not illustrated may be connected to IVR at switch 107. A system VXML browser may also be integrated with switch 107 through a voice application for enabling IVR assisted voice browsing of a Web site maintained in WS 106.

When an incoming call registers at switch 107, CTI processor/server 108 provides notification of the event to interaction server 124 and a new session is created. Interaction server 124 may be configured to represent in abstract form, an email session, an instant message session, a transaction session, a chat session, or other Web based interactive sessions. Interaction server 124 represents interactions as objects having parameters and defined interaction workflow that executes within the server to affect servicing or handling the event.

Interaction server 124 has network connectivity to a router or routing server (RS) 112. The inventors know of a routing server termed a universal routing server (URS). RS 112 includes a digital medium provided thereto by installation or through network or data link connection for storing executable routing strategies that are pre-defined or dynamically assembled for routing interaction events processed through server 107. A routing strategy is represented in this example as a routing strategy (RST) 119 executable from RS 112 upon request. When a session represented in interaction server 124 executes interaction workflow (IWF 117) relative to the session type and parameters, a point in the workflow may execute resulting in a request to RS 112 for a suitable RST 119 to be executed to help determine handling of the event. Typically a request invokes the routing strategy, and after execution and runtime the event is routed according to the strategy. The event may continue to be represented in server 107 and may be monitored until the session has been resolved or terminated.

In business process routing (BPR), business rules are executed as a result of routing strategy execution and run to determine how best to resolve interactive sessions represented in server 124. RS 112 has network connectivity, in this case, through the domain of interaction server 124 to an external services protocol (ESP) server 111. ESP server 111 includes a digital medium provided thereto by installation or by network or data link connection for storing rules invocation logic (RIL) 120 used to create a business object model for business rule execution. ESP server 111 functions in this example as a gateway server to a business rules engine, which may be a third-party rules engine adapted to execute business process rules.

Contact center 103 includes a statistics server (Stat) server 113 adapted to serve call center real-time statistics upon request. Such statistics might include the current estimated waiting time (EWT) in a particular agent queue, the current agent resources assigned for a queue, current agent workflow assignment configurations, availability statistics for live assistance, and other call center statistics related to center resources and workflows. Stat server 113 has connection to a data repository 115 adapted to store data used by the server to generate statistics.

CC 103 also includes a call center configuration (CFG) server 114. CFG server 114 is adapted to serve static call center configuration objects. Server 114 is connected to a data repository adapted to contain data used by the server to generate new configurations and modify existing configurations.

RS 112 may subscribe to either or to both servers 113 (Stat) and 114 (CFG). RIL 120 is invoked specifically to formulate a business object model illustrated herein as BOM 122. In the construction of this model, the ESP server may get data if required to generate a BOM through subscribing to call center statistics and configuration data through connection to the appropriate servers. Subscription to data may be according to a change-based notification scheme or a time-based notification scheme. ESP server 111 may be a dedicated server or a server application on a separate machine. In one embodiment of the invention, the ESP server is a Drools gateway that provides access to a Drools rule engine. Other third-party rules engines may be adapted to practice the present invention.

ESP server 111 has a direct data or network connection to a sophisticated business rules management server (BRMS) 109. BRMS 109 has a digital medium provided thereto by installation or by network or data link for storing a business rules engine (BRE) 118 and a rules application (Rule App) 121. BRMS 111 has connection to a data repository 110 adapted to store pre-defined business rules and/or rule constructs for dynamic rule presentation. BRE 118 may be a generic or a third-party rules engine.

Rule APP 121 includes a set of facts or a BOM and one or a set of business rules that use the BOM in execution. Technically the BRE runs inside of the rules application to execute business rules based on the BOM received. BOM 122 is generated at ESP server 111 as a result of initiation of RIL 120. BOM 122 is created from objects representing configuration data, statistical data, and interaction workflow data. In one embodiment the BRMS is Java-based under the JBoss application server program for use with Java 2 Platform Enterprise Edition (J2EE) and Enterprise Java Beans (EJB). The system can also be implemented in a .NET or a common business oriented language (such as COBOL) environment.

When an interaction event occurs it is represented in an abstract open media session using open media architecture (OMA) in interaction server 124. The interaction has a workflow or IWF 117. At some point the interaction needs to be routed so a request including the appropriate interaction parameters (object) is made from the interaction server to RS 112 to start a routing strategy for the open media session. RST 119 executes on behalf of the interaction event and during runtime comes to a point where one or more business process decisions need to be made. RST 119 contains an embedded routing object or external services object (ESO) that is adapted to invoke logic (RIL 120) within ESP server 111. The routing object (not illustrated) is executed on server 112 to send a request to gateway server 111 (ESP server) using external services protocol (ESP) for the request response protocol between the servers.

RIL on server 111 is started and creates BOM 122 and sends BOM 122 to BRMS 109 to be used in rule execution. A set of facts about the interaction event, the current contact center statistics, and the contact center configured state information. The interaction event parameters and the contact center statistics are dynamic while the contact center configure information is typically static and does not change. The BOM 122 is sent in this example to BRMS 109. BOM 122 becomes nested in rule application 121 as a set of facts for the business rule execution process.

When a rule or rules are executed, BRMS 109 sends the results back to the interaction server 124 and to the RS server 112. In one embodiment, rule application 121 is a predefined rule application that receives the BOM and retrieves the rule or rules for execution. Business rules 110 may be static rules that are pre-defined by hard coding or they may be generated from constructs including a conditional or "condition" and an "action". For example, the conditional phrases beginning with terms like "if" or "when" such as "if the email is a new email" (condition 1) "and if the potential customer can be identified as a top customer (condition 2), then offer a live interaction. When the condition proves true in the data and state considered then the action is implemented.

In a preferred embodiment execution of one or more rules using a BOM for rules data may result in a subsequent update to a portion of the BOM. For example, a priority ranking for an interaction can be increased as a result of rule execution. Some of the data used to generate BOM 122 is dynamic such as statistical data gathered in real time or interaction parameters. Therefore changes in data states may result in differences in rule selection and execution results lending to an update. An updated business object model can be used by the contact center system to generate an update to a contact center state such as a resource allocation configuration.

An exemplary rule presented in DRL notation is listed below:

```
rule "PriorityCalculatorGold"
salience 111
    no-loop true
    when
        ixn : _ Interaction (media type) = = "email" ,
interactiontype = = "inbound",
        interactionSubtype = = "InboundNew" , customerSegment = =
_Interaction.GOLD,
        BL Number = = 1, BL IxnWaitTime > 1) ;
    then
        System.out.println ("Rule      : PriorityCalculatorGold
        worked") ;
        System.out.println ("IxnType  : " +
        ixn. getInteractionType ( ) ) ;
        System.out.println ("IxnSubType : " +
        ixn.getInteractionSubtype ( ) ) ;
        System.out.println ("CustSegment : " +
        ixn.getCustomerSegment ( ) ) ;
        System.out.println (" BL         : " +
        ixn.getBL_Number ( ) ) ;
        System.out.Println (: IxnWaitTime : " +
        ixn.getBL_IxnWaitTime ( ) ) ;
        Ixn.setBL_IxnPriority (Ixn.getBL_IxnPriority ( ) +3) ;
        System.out.Println ('Changing Priority Gold: +3 : " +
ixn.getBL_IxnPiority ( ) ) ;
/ /    modify (ixn) ;
end
```

In the above example, the priority of the interaction is increased by 3 units after the "when" conditions are found to be true. The above rule works on the interaction object by changing the priority of handling or routing the interaction. The routing strategy that requested execution of the rule may implement a strategy based on the new priority.

Figure 2:
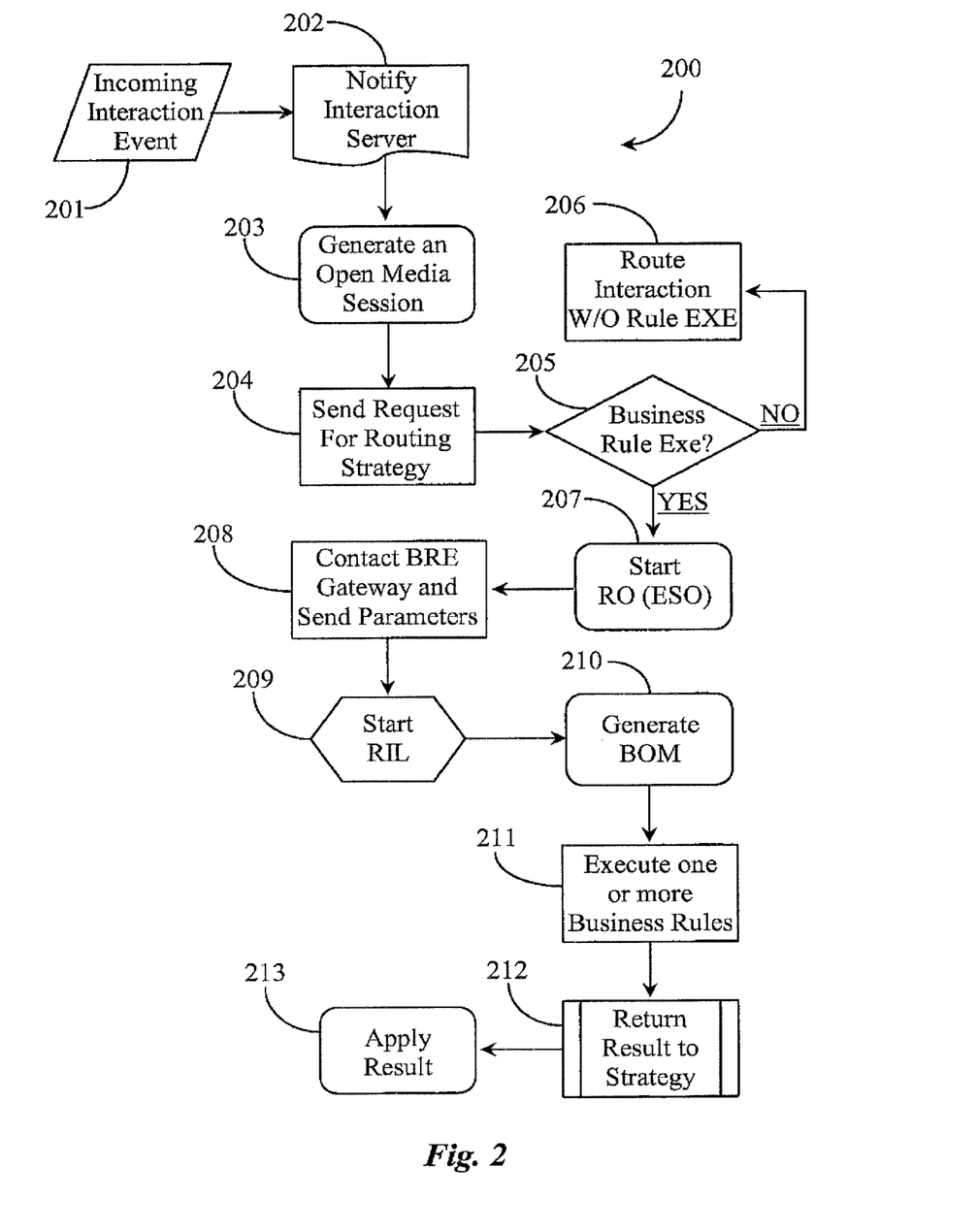
FIG. 2 is a process flow chart illustrating steps for routing an interaction according to business rule execution according to an embodiment of the present invention.

FIG. 2 is a process flow chart illustrating steps 200 for routing an interaction according to business rule execution according to an embodiment of the present invention. At step 201 an incoming interaction event arrives at the call center. The event could be a telephone call, an email, a chat request, a Web interaction, an instant message, a voice browser session, a short message service (SMS) message, a multimedia message service (MMS) message or some other type of traceable interaction that can be represented in an interaction server. At step 202 the interaction server is notified of the interaction.

At step 203 the interaction server generates an open media session representing the interaction. The session comprises an interaction object including parameters and workflow. At step 204 the interaction server requests a routing strategy from a routing server. The routing strategy generic for the interaction type and sub-type, if any, is executed. At step 205 the routing strategy may decide if business rule execution is necessary. In one embodiment all of the routing strategies have one or more points in process where business rule execution is required. In another embodiment depending on interaction type it is not required to execute a business rule to complete routing. If at step 205 the strategy does not call for BRE invocation, then at step 206 the interaction can be routed without rule execution.

If the routing strategy calls for business rule execution at step 205, then at step 207 the strategy executes a special routing object, which can be an external service object for invoking an external service using external service protocol (ESP). Execution of the routing object initiates a request at step 208 to a gateway server like ESP server 111 to execute rules invocation logic (RIL). Upon receiving the request and perhaps some additional parameters, the ESP server starts rule invocation logic at step 209.

At step 210 the rules gateway running RIL generates a business object model (BOM) to use in execution of one or more rules. The BOM is a set of facts that can be static and dynamic facts. The BOM is part of a rules application that includes the correct business rules to execute using the BOM as BRE data.

At step 211 one or more business rules are executed by the business rules engine (BRE). At step 212 the results of rule execution are returned to the routing server and the routing strategy that requested the rules based processing. At step 213 the routing strategy implements the rules-based routing or handling of the interaction. Results of rule execution may include some modification to the interaction object such as changing one or more attributes of the object like priority of the object such as through a customer segment scheme or other priority routines. It is noted herein that a rules application such as application 121 in FIG. 1 may be predefined and may already contain the rule specifications that will be executed. In another embodiment a rules application may be dynamically assembled using the appropriate rules constructs to create the business rules to be executed based on a dynamic BOM.

Figure 3:
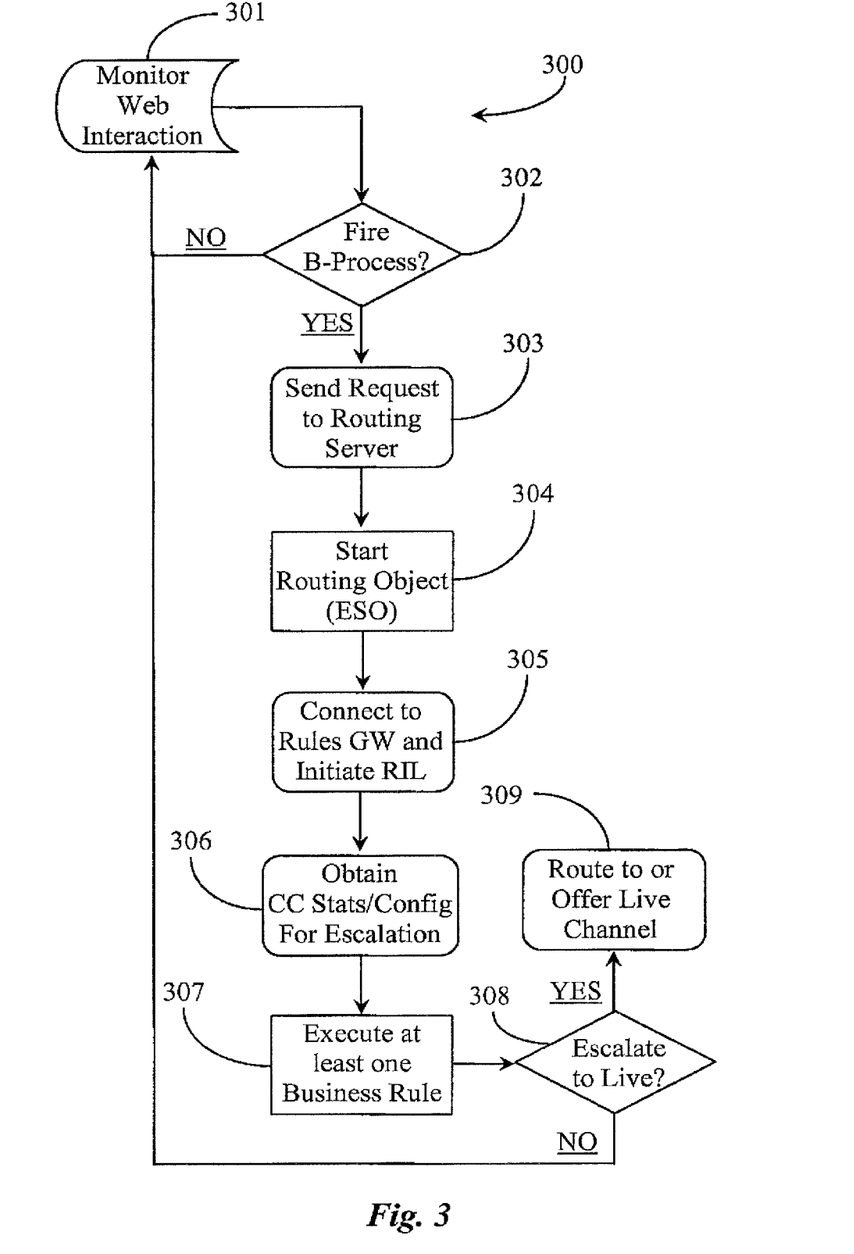
FIG. 3 is a process flow cart illustrating steps for escalating a Web session to a live channel according to an embodiment of the present invention.

FIG. 3 is a process flow cart illustrating steps 300 for escalating a Web session to a live channel according to an embodiment of the present invention. Business process routing (BPR) may be applied to session escalation. At step 301 a Web session monitor tracks a Web session. The Web session may be represented in an interaction server. At step 302 the system may determine whether to execute one or more business rules to specify if the session will be escalated. The Web session may be a VXML-based session where the customer is browsing the company Web site using a voice-enabled browser using an IVR.

If at step 302 no BRE involvement is ordered, then the process may loop back to monitoring at step 301. If BRE involvement is decided at step 302 then the interaction monitor sends a request at step 303 to the routing server. Upon receipt of the request, routing strategy is executed and a routing object or ESO is executed at step 304. Execution of the routing object initiates a request to the rules gateway (ESP) server at step 305 and the gateway invokes RIL.

At step 306 the RIL generates the BOM and may get CC statistics, configuration objects, and interaction parameters. The BOM generated is used for business rule execution within the rule application. At step 307 at least one rule is executed. Based on the result of execution the routing server may decide to escalate the self-help interaction to a live assistance channel (for example) at step 308. At step 309 the routing strategy escalates the session by routing or by offering a popup to the Web session for the customer to accept or to decline escalation to live assistance. If at step 308 the decision is made not to escalate the session, then the process may loop back to monitoring at step 301.

A time to live (TTL) may be imposed on monitoring such that, within a time window, if the session is not escalated monitoring may be discontinued for the particular session. Interaction object parameters sent along with the request for business rule execution may include navigation pattern data used in the decision process. Other facts might be considered such as customer segment, payment history, customer loyalty rating, and so on.

Figure 4:
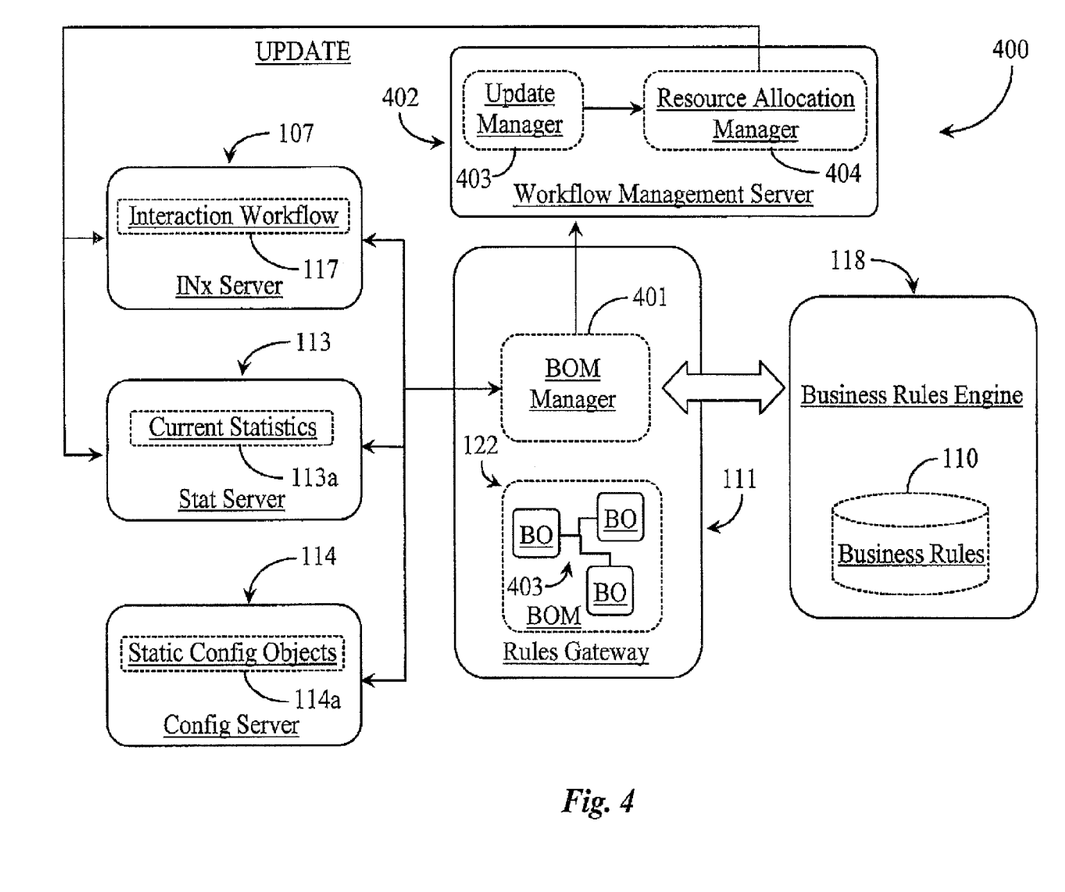
FIG. 4 is a block diagram illustrating components for business process routing and contact center updating according to tan embodiment of the present invention.

FIG. 4 is a block diagram illustrating components 400 for business process routing and contact center object updating according to an embodiment of the present invention. ESP server 111 is at the heart of components 400 and is where BOM 122 is generated each time a request for rule execution is received on behalf of an interaction routing strategy. BOM 122 contains several business objects (BOs) 403. A business object model manager 401 is provided in this example and is responsible for getting the required data to build the object model. Interaction server 124 running interaction workflow 117 may provide an interaction object and current attributes of the object (dynamic attributes) to BOM manager 401. Statistics server 113 may provide current statistics 113a in the form of a stat object to BOM manager 401. Configuration server 114 may provide static configuration objects 114a to BOM manager 401.

BOM manager 401 assembles BOM 122, which contains both dynamic and static facts. A BOM then is considered to be a dynamic object model that can be updated during business rules execution. Once BOM 122 is complete, rules engine 118 is invoked to execute one or more business rules 110. In this example, BOM manager 401 running in gateway 111 has connection to a workflow management server 402 having a digital medium provided thereto by installation or by network connection for storing current contact center workflow including current agent assignment information.

It may be determined in rule execution that an update should be performed with respect to contact center allocation of live resources (Agents) working within the system. In one embodiment, the BOM manager may communicate a suggested update to an update manager 403 running on server 402. In this case the update concerns agent allocation to working queues. The update manager after receiving the update data may implement the update by communicating the update in the form of a command to a resource allocation manager 404 also running on server 402.

The resource allocation manager has access to all of the resource objects within the center including agent allocation models. The update can be implemented by reassembling an agent allocation model to reflect a changed state. An example of agent reallocation might be moving or reassigning several agents working one campaign to begin working another campaign. For example, if the interaction is a telephone call in a queue of type campaign 12 and the EWT is > than (10) minutes and EWT for campaign 13 is < than (1) minute, then move 3 agents from campaign 13 to campaign 12.

Notification of the update made to agent allocation configuration might also be propagated to interaction server 124 and to statistics server 113 for predictive purposes assuming the EWT for queue 12 will now be considerable lowered as a result of the allocation modification.

Figure 5:
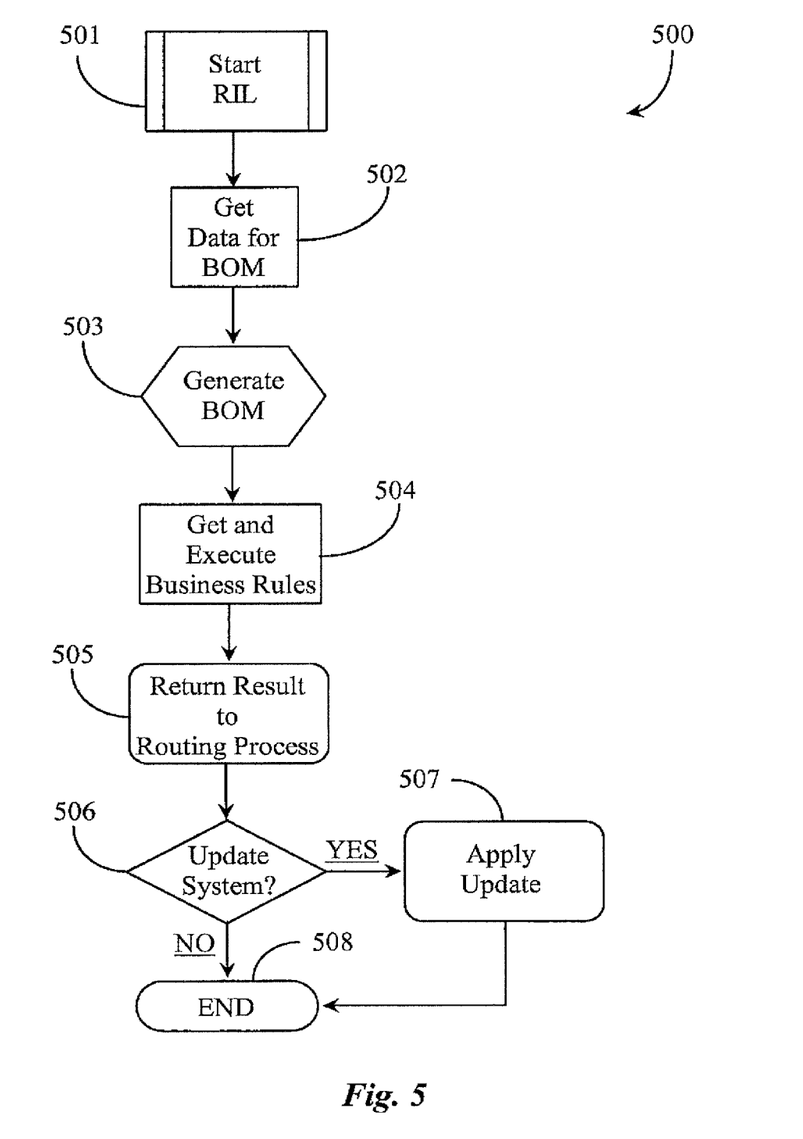
FIG. 5 is a process flow chart illustrating steps for application of a system update as a result of business object model generation and rule execution.

FIG. 5 is a process flow chart illustrating steps 500 for application of a system update as a result of business object model generation and rule execution. At step 501 the ESP server starts routing invocation logic (RIL). At step 503 the BOM manager gets data for creating a BOM for rules execution. At step 503 the RIL generates the BOM. At step 504 the BRE gets and executes the appropriate business rules or rules. At step 505 the result of rules execution is returned to the routing process.

At step 506 the system determines if there is a system update that should be implemented. If the system decides not to update then the process may end at step 508. If at step 506 there is an update that should be made then at step 507 the BOM manager running in the rules gateway applies the update by propagating the update to the appropriate update manager. Notice of the update may be propagated to affected systems for predictive purposes. The BPR system of the invention can be implemented in any contact center environment for virtually any type and subtype of interaction.

Several embodiments are described above, and in one embodiment a system for processing communication events in a contact center is provided, comprising an interaction server for managing events waiting to be routed, a routing server for routing the events, a rules engine, and a gateway server executing rules invocation logic and interacting with the rules engine. The interaction server tracks incoming events, initiates and sends a routing request to the routing server, including a special routing object, for each event that requires conformance to business rules, the routing server, executing the routing object, sends an execution request to the gateway server, which upon receipt of the request prepares a business object model (BOM), being a set of facts upon which the rules engine executes rules appropriate to the facts, resulting in routing direction for the routing server to route the event.

Similarly a method for routing an interaction event is provided, comprising the steps of (a) representing the interaction event in an interaction server using an abstract markup language; (b) requesting a routing strategy for handling the event; (c) sending a routing object to a routing server, which when it executes the routing object sends a request to a gateway server; (d) at the gateway server, in response to the request, creating a business object model representing a set of facts relevant to the interaction event and contact center state information; (e) starting a business rule engine to execute one or more business rules using the business object model as data for rule execution; and (f) returning the results of rule execution to the routing strategy.

It will be apparent to one with skill in the art that the business process routing system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for processing communication events for a contact center, the system comprising:
   a processor;
   memory, wherein the memory has stored therein instructions that, when executed by the processor, cause the processor to:
     receive, during execution of a routing strategy for routing a communication event, a set of facts associated with the communication event;
     execute a rule associated with the set of facts, the rule including a condition for performing an action;

determine, in response to executing the rule, that the condition is satisfied; and implement, in response to the condition being satisfied, the action, wherein the action includes updating the routing strategy for the routing of the communication event; and an electronic switch coupled to the processor, the electronic switch configured to distribute the communication event according to the updated routing strategy.

2. The system of claim 1, wherein the communication event is selected from a group consisting of a telephony call, email message, short message service (SMS) message, instant message, Web interaction, chat request voice browser session, multimedia message and service (MMS) message.

3. The system of claim 2, wherein the telephony call is a voice-over-IP call.

4. The system of claim 1, wherein the set of facts include a priority ranking indicative of priority of the communication event.

5. The system of claim 1, wherein the set of facts includes at least one of navigation data, customer segment, payment history, and customer loyalty rating associated with the communication event.

6. The system of claim 1, wherein the condition includes a wait time for a resource of the contact center being less than a threshold value.

7. The system of claim 1, wherein the condition includes an importance of the communication event exceeding a threshold value.

8. The system of claim 1, wherein the update to the routing strategy includes changing a priority ranking of the communication event.

9. The system of claim 1, wherein the rule is a business rule.

10. A method for processing communication events for a contact center, the method comprising:

receiving, by a processor, during execution of a routing strategy for routing a communication event, a set of facts associated with the communication event;

executing, by the processor, a rule associated with the set of facts, the rule including a condition for performing an action;

determining, by the processor, in response to executing the rule, that the condition is satisfied; and implementing, by the processor, in response to the condition being satisfied, the action, wherein the action includes updating the routing strategy for the routing of the communication event; and distributing, by an electronic switch coupled to the processor, the communication event according to the updated routing strategy.

11. The method of claim 10, wherein the communication event is selected from a group consisting of a telephony call, email message, short message service (SMS) message, instant message, Web interaction, chat request, voice browser session, multimedia message and service (MMS) message.

12. The method of claim 11, wherein the telephony call is a voice-over-IP call.

13. The method of claim 10, wherein the set of facts include a priority ranking indicative of priority of the communication event.

14. The method of claim 10, wherein the set of facts includes at least one of navigation data, customer segment, payment history, and customer loyalty rating associated with the communication event.

15. The method of claim 10, wherein the condition includes a wait time for a resource of the contact center being less than a threshold value.

16. The method of claim 10, wherein the condition includes an importance of the communication event exceeding a threshold value.

17. The method of claim 10, wherein the update to the routing strategy includes changing a priority ranking of the communication event.

18. The method of claim 10, wherein the rule is a business rule.

* * * * *